United States Patent [19]

Varley et al.

[11] Patent Number: 5,614,268

[45] Date of Patent: Mar. 25, 1997

[54] COATING COMPOSITION

[76] Inventors: Michael J. Varley, 5 Y Gwernydd, Glais, Swansea, Great Britain, SA7 9HF; John B. Thomas, Brydel Court, 31 Murton Lane, Newton, Mumbles, Swansea, Great Britain, SA3 4TR

[21] Appl. No.: 572,465

[22] Filed: Dec. 14, 1995

[30] Foreign Application Priority Data

Dec. 15, 1994 [GB] United Kingdom .................. 9425319

[51] Int. Cl.⁶ .............................. B05D 7/00; C09D 5/00; C09K 3/00
[52] U.S. Cl. .................. 427/486; 106/14.41; 252/388; 427/421; 427/428; 427/435; 428/457
[58] Field of Search .............................. 106/14.13, 14.41; 252/388, 301.16, 301.4 R; 427/421, 428, 435, 486; 428/457

[56]  References Cited

U.S. PATENT DOCUMENTS

| 1,448,790 | 9/1976 | Smith et al. ............................... 100/55 |
| 1,695,430 | 12/1928 | Klinger ................................. 106/14.41 |
| 2,334,158 | 11/1943 | Von Fuchs et al. .................. 106/14.13 |
| 2,426,496 | 8/1947 | Farley ................................. 106/14.13 |
| 3,623,987 | 11/1971 | Cameron Ker et al. .................. 252/69 |
| 4,163,700 | 8/1979 | Igarashi et al. ......................... 205/253 |
| 4,166,151 | 8/1979 | Jahnke ................................. 106/14.41 |
| 4,402,747 | 9/1983 | Bird et al. ............................. 106/14.41 |
| 4,507,339 | 3/1985 | Carbo et al. .............................. 428/35 |
| 5,089,658 | 2/1992 | Elmore et al. ....................... 106/14.41 |
| 5,230,730 | 7/1993 | Speckmann et al. ................ 106/14.41 |

FOREIGN PATENT DOCUMENTS

| 0200001 | 11/1986 | European Pat. Off. . |
| 2098507 | 11/1982 | United Kingdom . |
| 2113118 | 2/1983 | United Kingdom . |

*Primary Examiner*—Anthony Green
*Attorney, Agent, or Firm*—Townsend and Townsend and Crew LLP

[57]  ABSTRACT

A composition for coating a metal surface which comprises at least one $C_6$ to $C_{10}$ carboxylic acid, at least one citric acid ester and an organic solvent. The composition provides improved anti-corrosion protection for an extended period of time and metal surfaces coated with the composition can be painted without first removing the coating.

21 Claims, No Drawings

COATING COMPOSITION

The present invention relates to a composition and process for coating a metal surface.

BACKGROUND OF THE INVENTION

Metal sheets or coils are typically surface treated with a coating composition prior to being used in subsequent manufacturing processes, for example, in the manufacture of cans or other similar containers. The coating composition acts as a lubricant thereby facilitating handling of the metal sheets or coils. The coating composition also prevents abrasion and scratching and inhibits corrosion which may occur during storage and transport of the metal sheets or coils.

Various coating compositions have been proposed for use as lubricants, for example, naturally occurring vegetable oils and synthetic esters of carboxylic acids. Lubricating oils based on citric acid esters have also been used. EP 0,200,001 describes a lubricating oil containing a citric acid ester and a reaction product of a $C_3$ to $C_{18}$ carboxylic acid and an amine. The resultant lubricating oil is alleged to have improved anti-corrosive properties.

However, in order for a coating composition to be used on an industrial scale it should, ideally, possess a unique combination of properties. If any one property of the combination is missing, then the coating composition is not entirely satisfactory. The compositions used or proposed previously have, for this reason, not been entirely satisfactory.

SUMMARY OF THE INVENTION

The present invention seeks to provide a coating composition for metals which can be used on an industrial scale, which provides improved anti-corrosion protection for an extended period of time and which ensures that the ability of paints or other coatings to adhere to the coated metal surface is substantially the same as for the uncoated metal. This latter property is of importance because otherwise it would be necessary to remove the coating composition prior to further treatment, for example, paint application.

Other desirable characteristics of a coating composition include the prevention or reduction of staining of the metal surface. Staining usually results from the deposition of high boiling point residues. These residues may reduce paint adhesion to the metal surface. The compositions should be pharmacologically safe and non-toxic in the amounts applied to the metal surface particularly if the treated metal is to be used in the manufacture of containers for use in the food industry, and compatible with other materials such as paints which may be applied to the metal surface.

Accordingly, the present invention provides a composition for treating a metal surface comprising at least one short chain carboxylic acid, at least one citric acid ester and an organic solvent.

Short chain aliphatic carboxylic acids are preferred.

DETAILED DESCRIPTION OF THE INVENTION AND PREFERRED EMBODIMENTS

A preferred composition comprises at least one $C_6$ to $C_{10}$ carboxylic acid; at least one citric acid ester having the formula:

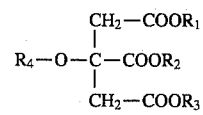

wherein each of $R_1$, $R_2$ and $R_3$ is hydrogen or $C_1$ to $C_8$ hydrocarbon, preferably alkyl and more preferably $C_1$ to $C_4$ alkyl, and $R_4$ is hydrogen or acetyl; and an organic solvent.

Compositions comprising carboxylic acids having less than 6 carbon atoms lack the desired anti-corrosive properties, whereas compositions comprising carboxylic acids having more than 10 carbon atoms are too oily and it becomes difficult to obtain a uniform coating on the metal surface.

Suitably, the composition comprises about 10 to 25% by weight carboxylic acid, about 55 to 85% by weight citric acid ester and about 5 to 20% by weight organic solvent.

For compositions which are to be applied by electrostatic deposition (a preferred method of coating), the composition preferably has an electrical resistance of between 0.1 to 2 mega ohms (MΩ) at 25° C. Preferably the electrical resistance of the composition should remain within the above range at the operating temperature of a typical electrostatic oiling system, usually about 50° C.

Compositions having an electrical resistance which is too low cannot be applied electrostatically without costly modifications to the electrostatic oiling system being made. On the other hand, if the electrical resistance is too high then it is difficult to obtain a coating of uniform thickness by electrostatic deposition.

Preferred citric acid esters are triethyl citrate, acetyl triethyl citrate, tributyl citrate and acetyl tributyl citrate. A preferred carboxylic acid is octanoic acid.

Preferably, the solvent is an alicyclic hydrocarbon and more preferably a cycloalkane or cycloalkene or mixtures thereof. Suitable solvents are Nappar 10 or 11, which are a mixture of $C_9$, $C_{10}$ and $C_{11}$ naphthenes.

A preferred composition comprises an indicator which permits the coverage of the metal surface with the composition to be determined. Previously, poor coverage of the metal surface only became apparent once corrosion of the treated metal had occurred. By providing an indicator in the composition, coverage of the metal surface can be easily and quickly assessed. Preferred indicators are luminescent and particularly fluorescent materials.

The composition can be applied to any metal surface. Metals which would particularly benefit from being coated with the composition of the present invention are ferrous metals, zinc and tin. Zinc and tin are often used as coatings for ferrous metals such as steel.

A specific example of the coating composition of the present invention will now be described.

A composition containing 15.6% by weight octanoic acid, 71.8% by weight tributyl citrate, 9.5% by weight Nappar 11 and 3.1% by weight 2-butoxyethanol was prepared by mixing the reagents at ambient temperature. The reagents are standard grade. Nappar 11 is a substantially aromatic-free mixture of $C_9$, $C_{10}$ and $C_{11}$ cyclic hydrocarbons. Nappar 11 can be purchased from Exxon Chemicals.

The following characteristics of the composition were studied to determine its effectiveness and usefulness as an anti-corrosive coating.

(i) Electrical Resistance

The electrical resistance of the composition was measured at ambient temperature using an electronic probe. The composition was then heated to 50° C., the operating temperature of a typical electrostatic oiling system, to reduce the resistance.

The electrical resistance of the composition at 25° C. and 50° C. was 0.7 MΩ and 1.3 MΩ, respectively.

Thus, the electrical resistance of the composition at both temperatures fell within the desired range of 0.1 to 2 MΩ.

(ii) Electrostatic Application

The composition was applied electrostatically by methods well known in the art to steel panels at surface concentrations of 20 mg/m$^2$, 50 mg/m$^2$, 100 mg/m$^2$ and 200 mg/m$^2$. The resultant spray patterns were examined.

All surface concentrations tested showed excellent spray patterns and gave good uniform coverage. Further tests have revealed that the composition can be applied satisfactorily at surface concentrations below 10 mg/m$^2$.

(iii) Corrosion Protection

Post annealed steel panels (previously vapor degreased using 1,1,1-trichloroethane) were coated electrostatically with the composition at surface concentrations of 50 mg/m$^2$ and 200 mg/m$^2$. The panels were placed under a cold air fan for 5 minutes to remove excess solvent, then clamped into packs and placed in a constant humidity cabinet (100% relative humidity (RH) at 40° C). The amount of rusting on the inner surfaces of the packs was measured after 7, 14, 28 and 84 days. The amount of rusting on the inner surfaces of packs of uncoated panels (blanks) was measured for comparison.

In addition to the humidity cabinet pack tests, packs of panels were exposed near a wrapped coil stocking area at a cold mill site typically used for storing metal sheets or coils.

The results are summarized in the table below.

TABLE 1

| | Humidity Cabinet (40° C. 100% R.H.) Mean % Spot Rust | | | | Cold Mill Wrapped Coil Stock Area Mean % Spot Rust | | | |
|---|---|---|---|---|---|---|---|---|
| Days Exposure | +7 | +14 | +28 | +84 | +7 | +14 | +28 | +84 |
| Composition 200 mg/m$^2$ | 2.1 | 1.3 | 0.9 | 0.6 | 0.7 | 1.0 | 0.2 | 0.1 |
| Composition 50 mg/m$^2$ | 0.8 | 1.9 | 1.5 | 1.4 | <0.1 | 0.3 | <0.1 | 0.2 |
| Blanks | 12.3 | 13.0 | 17.4 | 16.5 | 0.3 | 1.2 | 2.5 | 1.4 |

Panels treated with the composition exhibited a low incidence of rusting even after 84 days exposure. Moreover, stains were not evident on any of the coated panels.

(iv) Paint Adhesion

Paint adhesion tests were performed using Dulux Stoving Drum Finish Pantone 326 Blue Ref No. H630-4866. This paint is formulated specifically for the factory painting of the exterior surfaces of metal drums.

Paint adhesion was determined for steel panels coated at surface concentrations of 50 mg/m$^2$ and 200 mg/m$^2$ and for uncoated panels.

TABLE 2

| | % Paint Adhesion (6 Panels) | | | | | | Mean |
|---|---|---|---|---|---|---|---|
| Composition 200 mg/m$^2$ | 98 | 99 | 97 | 98 | 99 | 98 | 98 |
| Composition 50 mg/m$^2$ | 98 | 99 | 98 | 98 | 98 | 98 | 98 |
| Blanks | 99 | 99 | 99 | 99 | 99 | 99 | 99 |

Further tests have revealed that it is, in fact, possible to directly paint metals coated at surface concentrations in excess of 300 mg/m$^2$.

It will be apparent from the above description that various modifications and alterations can be easily made to the compositions described above. Protection is sought for any and all matter herein.

We claim:

1. A composition for coating a metal surface comprising at least one $C_6$ to $C_{10}$ carboxylic acid, at least one citric acid ester and an organic solvent.

2. A composition according to claim 1, wherein said at least one citric acid ester has the formula:

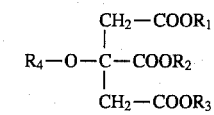

wherein each of $R_1$, $R_2$ and $R_3$ are members selected from the group consisting of hydrogen and $C_1$ to $C_8$ hydrocarbon and $R_4$ is a member selected from the group consisting of hydrogen and acetyl.

3. A composition according to claims 1 or 2, comprising about 10 to 25% by weight carboxylic acid, about 55 to 85% by weight citric acid ester and about 5 to 20% by weight solvent.

4. A composition according to claim 1, wherein said at least one citric acid ester is a member selected from the group consisting of triethyl citrate, acetyl triethyl citrate, tributyl citrate, acetyl tributyl citrate and mixtures thereof.

5. A composition according to claim 1, wherein said at least one carboxylic acid is octanoic acid.

6. A composition according to claim 1, wherein the solvent is an alicyclic hydrocarbon.

7. A composition according to claim 1, wherein the solvent comprises a member selected from the group consisting of a cycloalkane, a cycloalkene, and mixtures thereof.

8. A composition according to claim 7, wherein the solvent comprises a mixture of $C_9$ to $C_{11}$ alicyclic hydrocarbons.

9. A composition according to claim 1, further comprising a luminescent material or phosphorescent material in an amount sufficient to generate a detectable emission.

10. A composition according to claim 9, wherein the luminescent material or phosphorescent material is present in an amount of 1 to 5% by weight.

11. A composition according to claims 9 or 10, wherein the luminescent material is fluorescent.

12. A composition according to claim 1, further comprising a glycol ether in an amount of 1 to 5% by weight.

13. A composition according to claim 12, wherein the glycol ether is 2-butoxyethanol.

14. A composition according to claim 2 comprising about 15% by weight octanoic acid, about 72% by weight tributyl citrate, about 10% by weight of a mixture of $C_9$ to $C_{11}$ alicyclic hydrocarbons, and about 3% by weight 2-butoxyethanol.

15. A composition according to claim 1, having an electrical resistance at 25° C. of 0.1 to 2.0 mΩ.

16. A process for coating a metal surface with a composition comprising at least one $C_6$ to $C_{10}$ carboxylic acid, at least one citric acid ester and an organic solvent, said process comprising applying the composition to the metal surface in an amount of 5 to 350 mg/m$^2$.

17. A process according to claim 16, comprising applying the composition to the metal surface by a method selected form the group consisting of electrostatic deposition, spraying, immersion coating and roller coating.

18. A metal coated with a composition comprising at least one $C_6$ to $C_{10}$ carboxylic acid, at least one citric acid ester and an organic solvent.

19. A metal according to claim 18, wherein the metal is a ferrous metal.

20. A metal according to claim 19, wherein the ferrous metal is steel.

21. A metal according to claim 18, wherein the metal is zinc or tin.

* * * * *